US010748024B2

(12) United States Patent
Ungarish et al.

(10) Patent No.: US 10,748,024 B2
(45) Date of Patent: Aug. 18, 2020

(54) METHOD AND SYSTEM FOR DETECTING A PERSON IN AN IMAGE BASED ON LOCATION IN THE IMAGE

(71) Applicant: POINTGRAB LTD., Hod Hasharon (IL)

(72) Inventors: David Ungarish, Tivon (IL); Moshe Nakash, Kiryat Ono (IL)

(73) Assignee: POINTGRAB LTD., Hod Hasharon (IM)

( * ) Notice: Subject to any disclaimer, the term of this patent is extended or adjusted under 35 U.S.C. 154(b) by 118 days.

(21) Appl. No.: 16/168,904

(22) Filed: Oct. 24, 2018

(65) Prior Publication Data
US 2019/0122065 A1 Apr. 25, 2019

(30) Foreign Application Priority Data
Oct. 24, 2017 (IL) .......................................... 255249

(51) Int. Cl.
G06K 9/00 (2006.01)
G06K 9/32 (2006.01)

(52) U.S. Cl.
CPC ....... G06K 9/3241 (2013.01); G06K 9/00369 (2013.01); G06K 9/00771 (2013.01)

(58) Field of Classification Search
CPC .......... G06K 9/32; G06K 9/00; G06K 9/3241; G06K 9/00369; G06K 9/00771; H04N 21/234; H04N 21/44; H04N 19/89; H04N 21/8358; H04N 19/186; H04M 3/22; H04M 3/5175; G06F 11/3688; G06F 9/44

USPC ........................................ 382/103; 379/265.7
See application file for complete search history.

(56) References Cited

U.S. PATENT DOCUMENTS

| 8,401,232 B2* | 3/2013 | Fan ..................... G06K 9/00771 348/169 |
| 2005/0257748 A1* | 11/2005 | Kriesel .................. A01K 29/00 119/51.02 |
| 2010/0328443 A1* | 12/2010 | Lynam .................. G06K 9/036 348/77 |
| 2013/0100284 A1* | 4/2013 | Fujii ..................... A61B 5/1117 348/135 |
| 2014/0058559 A1* | 2/2014 | Haynes .................. A01K 15/02 700/232 |
| 2014/0140596 A1* | 5/2014 | Kawaguchi ........ G06K 9/00335 382/128 |
| 2014/0177915 A1* | 6/2014 | Fan ......................... G06T 7/174 382/103 |
| 2014/0218483 A1* | 8/2014 | Wang ...................... G06T 7/596 348/47 |

(Continued)

FOREIGN PATENT DOCUMENTS

| CN | 102436656 A | * | 5/2012 | |
| GB | 201011457 | * | 8/2010 | ............. G06F 3/017 |

Primary Examiner — Mahendra R Patel
(74) Attorney, Agent, or Firm — Alphapatent Associates, Ltd; Daniel J. Swirsky

(57) ABSTRACT

A method and system for detecting a person in an image of a space include determining a value of a parameter of an object in the image, wherein if the value exceeds a threshold the object is determined to be a person. If the object is located in a predetermined area in the image, then changing the threshold and determining that the object is a person based on the value of the parameter and the changed threshold.

20 Claims, 8 Drawing Sheets

(56) References Cited

U.S. PATENT DOCUMENTS

| | | | |
|---|---|---|---|
| 2014/0270358 A1* | 9/2014 | Zhu | G06K 9/4642 |
| | | | 382/103 |
| 2015/0051512 A1* | 2/2015 | Kim | A61B 5/1128 |
| | | | 600/587 |
| 2016/0133025 A1* | 5/2016 | Wang | G06K 9/00778 |
| | | | 348/135 |
| 2016/0335490 A1* | 11/2016 | Wang | G06K 9/00778 |
| 2018/0174320 A1* | 6/2018 | Hayashi | G06K 9/00228 |

\* cited by examiner

METHOD AND SYSTEM FOR DETECTING A PERSON IN AN IMAGE BASED ON LOCATION IN THE IMAGE

FIELD

The invention relates to the field of computer vision, specifically, to automatic detection of a person or other occupant in images.

BACKGROUND

The ability to detect and monitor occupants in a space, such as a room or building, enables planning and controlling home or building systems for better space utilization, to minimize energy use, for security systems and more.

Computer vision is sometimes used to analyze an imaged space and to detect occupants in the space.

There exist systems that use one or more cameras to monitor a space or area. Some of these systems use cameras located in a ceiling of a monitored area providing overhead tracking of occupants. However, in the case of overhead tracking, the shapes of people's bodies are highly deformable and show very high perspective distortion. Thus, top view images are not easily understood by current image analysis techniques and systems using top view images do not easily detect people.

SUMMARY

Methods and systems to determine that an object in an image is a person, according to embodiments of the invention, utilize the location of the object in the image to facilitate accuracy and efficiency of automatic detection of people in images.

In one embodiment a processor determines that an object in a top-view image of a space is a person based on parameters of the object in the image; parameters such as size of the object, size of motion created by the object, direction of motion of the object, profile of the motion field created by the motion, etc. Typically, if the value of the parameter is within a specific range (e.g., exceeds a predetermined threshold) the object is determined to be a person (e.g., has a high probability of being a person). However, in some cases, assumptions can be made about people located at specific locations in images (which correlate to specific locations in the real-world space being imaged) which can affect the value of a parameter of the imaged person. For example, in an area of a chair or other such furniture an assumption can be made that a person in this area is sitting and as such is expected to be represented in a top view image, for example, by a smaller object than a standing person in the same area. Thus, if an object is located in an area of a chair, the threshold for determining if that object is a person, based, for example, on the size of the object in the image, may be lowered and even an object having a smaller size than expected, can be determined to be a person, based on its size.

In one embodiment, a processor receives an indication of a type of location or region in an imaged space and calibrates the object parameter values based on the type of location. Thus, if an indication is received that a region in an image is a region of a desk, for example, it is assumed that occupancy in this region will be of a single, sitting, person. The threshold of parameters (e.g., size and motion) may be set according to this assumption.

Systems and methods according to embodiments of the invention may be used to automatically assign space related resources in spaces such as offices, manufacturing plants, health care centers and more.

BRIEF DESCRIPTION OF THE DRAWINGS

The invention will now be described in relation to certain examples and embodiments with reference to the following illustrative drawing figures so that it may be more fully understood. In the drawings.

DETAILED DESCRIPTION

Embodiments of the invention provide methods and systems for automatically determining that an object in an image of a space is a person. The determination may be used to determine occupancy in the space. The determination of occupancy in a space may be employed for efficient utilization of the space.

"Determining occupancy" or "detecting occupancy" may include detecting an occupant (e.g., person) and/or monitoring one or more occupants throughout the space e.g., counting occupants, tracking occupants, determining occupants' location in a space, etc.

The examples described herein refer to a human occupant in a space however, "occupant" may refer to any type of body in a space, such as a human and/or animal and/or inanimate object. Thus, embodiments of the invention may be used to detect human and/or non-human occupants.

Figure 1A:
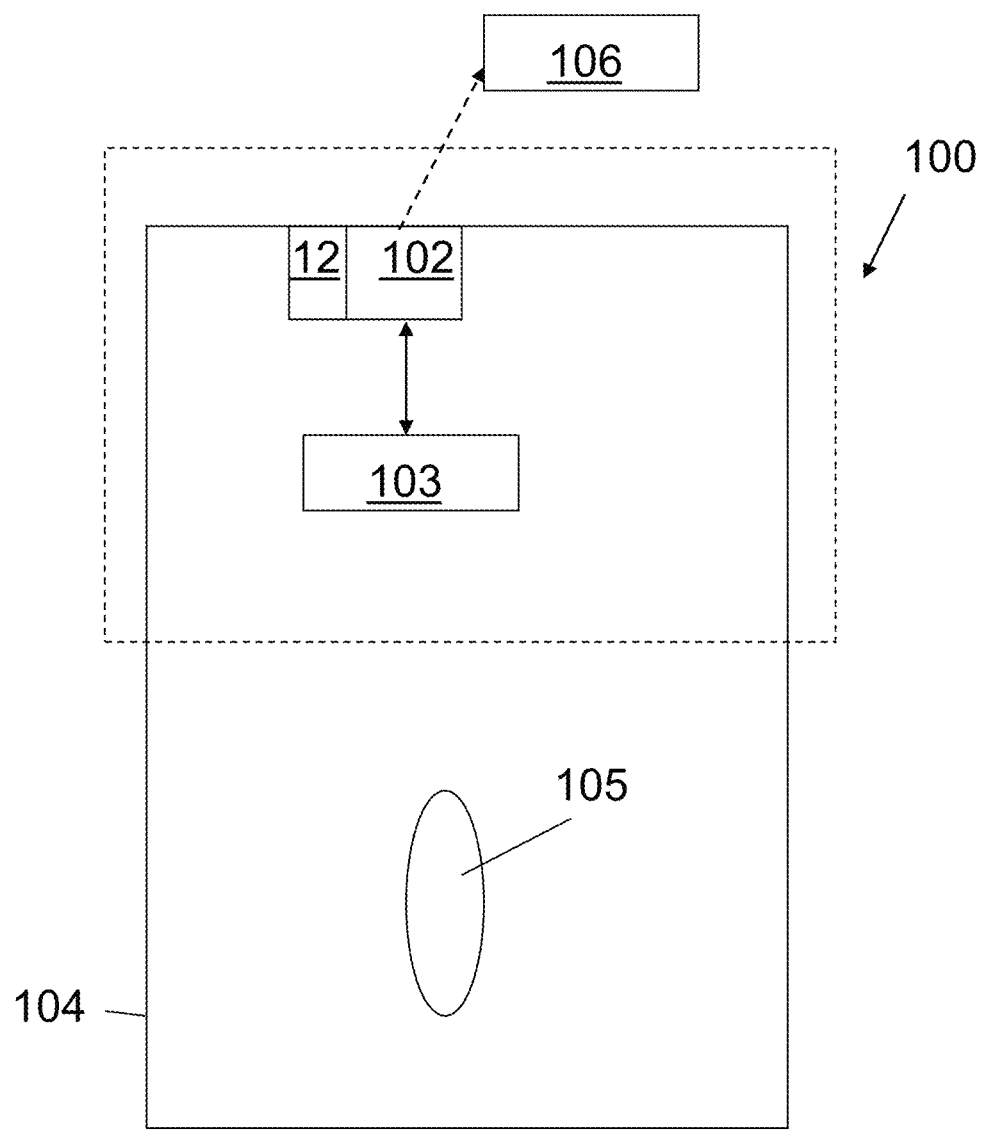
FIGS. 1A and 1B are schematic illustrations of systems operable according to embodiments of the invention.
Figure 1B:
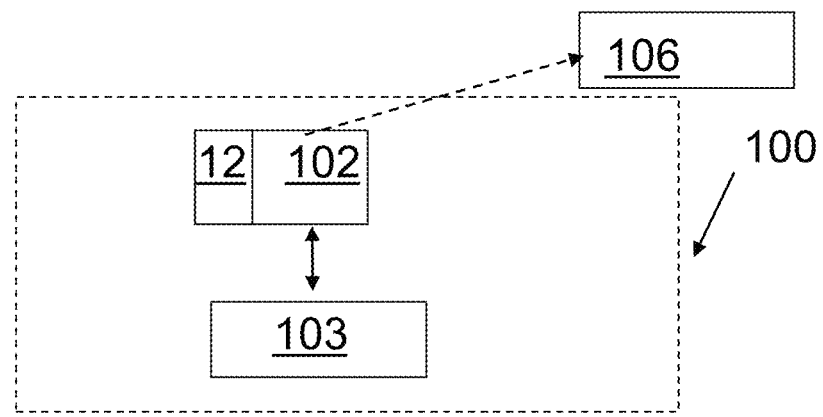
Figure 1B:
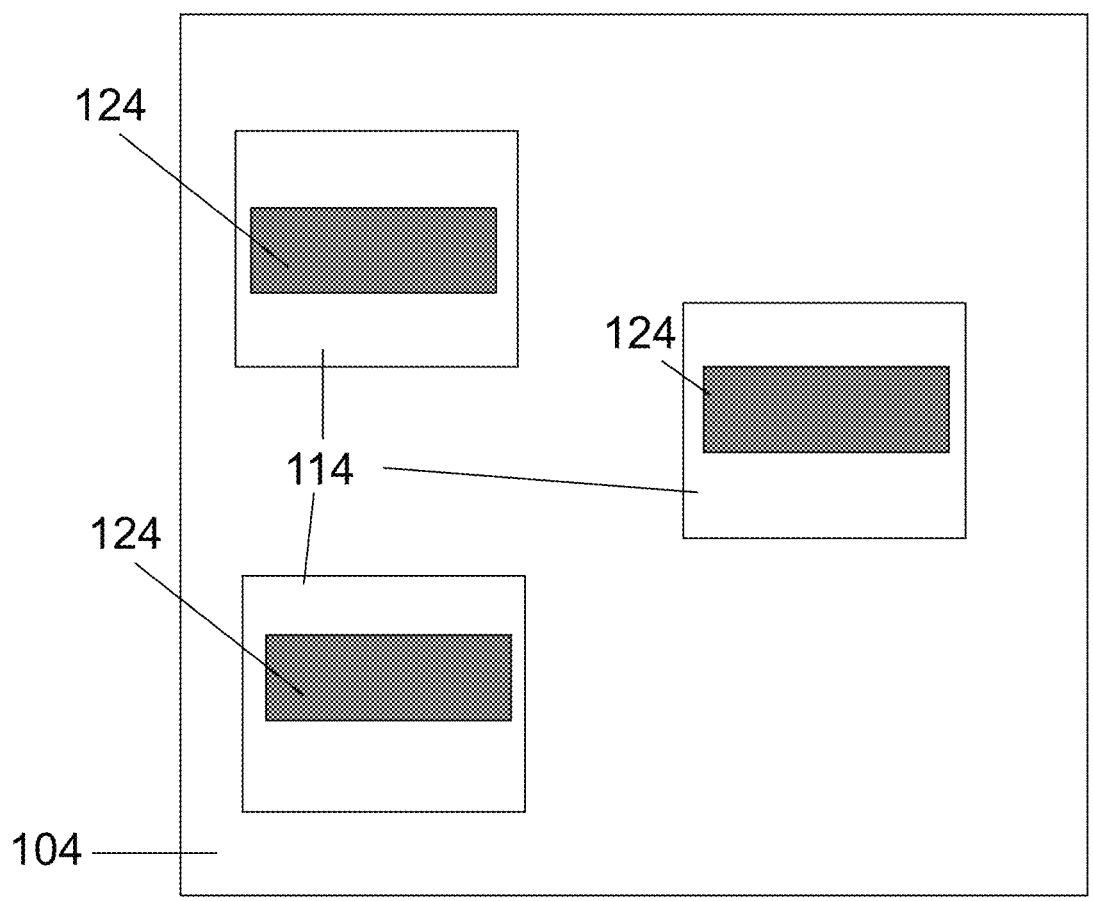

Examples of systems operable according to embodiments of the invention are schematically illustrated in FIGS. 1A and 1B.

In the following description, various aspects of the invention will be described. For purposes of explanation, specific configurations and details are set forth in order to provide a thorough understanding of the invention. However, it will also be apparent to one skilled in the art that the invention may be practiced without all the specific details presented herein. Furthermore, well known features may be omitted or simplified in order not to obscure the invention.

Unless specifically stated otherwise, as apparent from the following discussions, it is appreciated that throughout the specification discussions utilizing terms such as "processing," "computing," "calculating," "determining," "detecting", "identifying", "assigning", "combining" or the like, refer to the action and/or processes of a computer or computing system, or similar electronic computing device, that manipulates and/or transforms data represented as physical, such as electronic, quantities within the computing system's registers and/or memories into other data similarly represented as physical quantities within the computing system's memories, registers or other such information storage, transmission or display devices.

In one embodiment, which is schematically illustrated in FIG. 1A, the system 100 includes an image sensor 103, which may be part of a camera monitoring a space, such as a room 104 or portion of the room 104, and obtaining images of the space (e.g., room 104). The camera may obtain 2D and/or 3D images.

In one embodiment the image sensor 103 is configured to obtain a top view of a space. For example, a camera including image sensor 103 may be located on a ceiling of room 104 typically in parallel to the floor of the room 104, to obtain a top view of the room or of part of the room 104. The images obtained by image sensor 103 may be 2D and/or 3D images.

The image sensor 103 may be associated with a processor 102 and a memory 12.

Processor 102 may include, for example, one or more processors and may be a central processing unit (CPU), a digital signal processor (DSP), a microprocessor, a controller, a chip, a microchip, an integrated circuit (IC), or any other suitable multi-purpose or specific processor or controller.

Memory unit(s) 12 may include, for example, a random access memory (RAM), a dynamic RAM (DRAM), a flash memory, a volatile memory, a non-volatile memory, a cache memory, a buffer, a short term memory unit, a long term memory unit, or other suitable memory units or storage units.

Images obtained by the image sensor 103 are typically analyzed by processor 102. For example, image/video signal processing algorithms and/or shape detection algorithms and/or machine learning processes may be run by processor 102 and may be used to analyze images from image sensor 103.

According to some embodiments, the images may be stored in memory 12. Processor 102 can apply image analysis algorithms, such as known motion detection and shape detection algorithms and/or machine learning processes in combination with methods according to embodiments of the invention to detect occupancy in a space from the images.

Processor 102 may run shape detection/recognition algorithms to detect the shape of an object (such as object 105) in an image. For example, shape detection/recognition algorithms may include an algorithm, which calculates features in a Viola-Jones object detection framework. In another example, the processor 102 may run a machine learning process to detect a shape of an object. For example, a machine learning process may run a set of algorithms that use multiple processing layers on an image to identify desired image features (image features may include any information obtainable from an image, e.g., the existence of objects or parts of objects, their location, their type and more). Each processing layer receives input from the layer below and produces output that is given to the layer above, until the highest layer produces the desired image features.

Based on identification of the desired image features a shape of an object may be determined.

Processor 102 runs algorithms and processes to detect a person and/or to determine occupancy in the space based on input from image sensor 103, according to embodiments of the invention. Based on detection of a person and/or determination of occupancy, the processor 102 may output information or signals, which may be used for controlling devices, e.g., environment comfort devices (such as heating, ventilating and air-conditioning (HVAC) devices) remote devices, for counting occupants in the space, for monitoring occupants, for automatically assigning space related resources in spaces (such as automatically assigning desks in office space), and more.

Processor 102 may run processes to enable detection of objects from a top view, e.g., by using rotation invariant features to identify a shape of an object or by using learning examples for a machine learning process including images of top views of objects such as humans.

In one embodiment processor 102 is used to determine a value of a parameter of an object 105 in an image of a space and based on the value of the parameter and on the location of the object in the image, determine if the object 105 is a person.

A parameter of an object is typically a feature characteristic to the object in an image or images, such as a size of the object in an image, the size and/or direction of movement of the object in a series of images, profile of the motion field created by the motion of the object, etc. In one embodiment, a parameter of an object includes a combination of characteristics features, e.g., size of an object and size of motion of an object. Each such parameter may be represented by a value. For example, the value of a size of a small object will be smaller than the value of the size of a larger object. Similarly, the value of movement of an object having large movements will be larger than the value of movement of an object having smaller movements.

In some cases, an object representing a person in an image, e.g., a top view image, can be expected to be of a certain size and/or shape (dependent on parameters of the camera, distance of the camera from the floor, etc.) when standing and a different size and/or shape when sitting. Thus, if an object is located in vicinity of a furniture (e.g., chair, sofa, bed, desk, etc.) or in another area in which a person may be expected to be sitting rather than standing, then, for example, even a small value of the size of the object may be taken into account in determining that the object is a person. For example, the probability that a small object is a person may be raised if the object is located in an area where a person is expected to be sitting rather than standing.

Based on the determination that the object 105 is a person, processor 102 may output a signal. In one embodiment, the signal output from processor 102 is used to assign resources of a space. For example, output from processor 102 may be used by space related resources management system software (e.g., in a smart building management system) to assign workstations to occupants in the space.

In one embodiment, which is exemplified in FIG. 1B, processor 102 (or another processor) may determine a region or detect a predetermined region 114 (or regions) in the image. A predetermined region typically correlates to and/or includes a predefined location in the space (for example, the location of a space related resource, e.g., a workstation or sitting area). The predefined location in the space may be a location of furniture such as a desk 124, chair or bed.

The predetermined region 114 may be identified by processor 102 from an image of the space. For example, a desk 124 or chair may be identified by applying on the image computer vision algorithms such as object detection algorithms and/or color detection algorithms and/or shape detection algorithms, to identify the furniture in the image and the predetermined region 114 may be defined based on the identification of the furniture in the image. For example, region 114 may include the location of the furniture and/or a predefined area in vicinity of the furniture or an area which includes (e.g., surrounds) the furniture.

In another embodiment a signal may be received at processor 102 (e.g., a signal from another processor or based on input from a user, such as a building management personnel) indicating a location and type of location (e.g., a location of a workstation) in the real-world space and/or in the image. The predetermined region 114 may then be determined based on the received signal. In some embodiments, the indication of type of region 114 causes thresholds of the object parameters to change according to the type of region indicated. Thus, if an object is located in a region for which indication is received that this is a region in which a person is expected to be sitting rather than standing, then, for example, the threshold of size of the object may be lowered such that the probability that even a small object is a person may be raised, based on the indication.

A signal indicating a real-world location in a space (such as room 104) may be received by processor 102 and may then be transformed to a location in the image (e.g., using information such as distance of the camera from the floor, size of image etc.). Alternatively, processor 102 may detect a location in the image (e.g., by detecting a workstation in the image using computer vision algorithms, as described above) and may transform the location from the image to a real world location by using, for example, projective geometry. If the location in the real-world corresponds to predetermined coordinates in the real-world space, then the areas in the image may be determined to be predetermined areas.

In some embodiments processor 102 detects, in an image, an object having a certain probability of being a person and determines if the object is a person based on the probability. In one embodiment the processor 102 determines a value of a parameter of the object in the image and if the value is within a predetermined range, then the probability of the object being a person is raised if the object is located in the predetermined area 114 and lowered (or not raised) if the object is not located in the predetermined area 114.

For example, if the value of the size of the object is too small to indicate a standing person but not too small to indicate a sitting person, then if the object is detected in an area of a chair the probability that the object is a person, is raised. However, if the object is not located in an area of a chair then the probability of the object of being a person is either not raised or is lowered.

In other cases, processor 102 detects an object in an image of a space and determines, from the image, a value of a parameter of the object (e.g., size of the object in the image, the size and/or direction of movement of the object, etc.). If the value exceeds a threshold, e.g., a pre-set or dynamically set threshold the object is determined to be a person. In one embodiment, if the object is located in the predetermined area, then the threshold is changed. Thus, an object located in a specific, predefined, region in the image (or area of the real-world space) may be determined to be a person based on a different threshold than an object located in other regions in the image (or regions of the real-world space).

In some embodiments a region is not predefined but rather dynamically defined. For example, a region in an image may be generated or defined based on data aggregated from the monitored space. For example, regions in which most new objects are detected may be defined as entrance regions. Regions having people lingering and moving slowly may be defined as regions of a queue. In another example, regions may be defined based on the frequency of detecting a person in them. These areas can be learned based on long-term statistics and then the dynamically set threshold (or a set of dynamically set thresholds) can be adjusted accordingly.

The processor 102 may be in wired or wireless communication with devices and other processors. For example, output from processor 102 may trigger a process within the processor 102 or may be transmitted to another processor or device to activate a process at the other processor or device.

A counter may be run by a processor to count occupants according to embodiments of the invention. The counter may be part of processor 102 or may be part of another processor that accepts input from processor 102.

In one embodiment an image of a room 104 (or part of the room), obtained by image sensor 103 is analyzed by processor 102 to detect a shape of an object 105. In one embodiment a shape of the object 105 is detected, and determining that the object is a person is based on the detected shape and on the value of the parameter. In some embodiments object 105 is assigned a probability of being a person based on the detected shape.

The detected shape of object 105 may be a 2D or 3D shape. Similarly, image data obtained by image sensor 103 may include 2D and/or 3D image information.

In one embodiment the system 100 is used for assigning space related resources. For example, system 100 may be part of an office organization system in which a single physical work space is used by multiple workers for efficient space utilization. The system may use software to allow companies to manage many space-related resources such as conference rooms, desks, offices, and project rooms. In one example, a network of sensors (e.g., image sensors 103) deliver data to a remote device (e.g., in the cloud) for further analysis, for counting people and/or for efficiently assigning space related resources (such as desks) in the single physical work space.

In one embodiment a monitor 106 is in communication with processor 102. In some embodiments information or signals output from processor 102, are used to control monitor 106, for example, to change its display. The monitor 106, which may be remotely located, may be used, for example, with a smart building management system, to display assignment of a resource of the space (e.g., workstations) to occupants and/or to display a number of occupants in the space and optionally, locations of occupants.

In this embodiment the system 100 includes a processor 102 to determine a value of a parameter (e.g., one or a combination of: motion size and object size) of an object 105 in an image of a space, (e.g., a building floor or room 104) and based on the value and on the location of the object 105 in the image, determine if the object 105 is a person. Processor 102 (or another associated processor) then assigns resources of the space (e.g., desks 124) based on the determination if the object is a person.

Processor 102 may then generate a signal to control monitor 106 (e.g., to display and/or change the display of the assignment of the resources of the space and/or to change a display of number of occupants in the space), based on the determination that the object 105 is a person.

Figure 2:
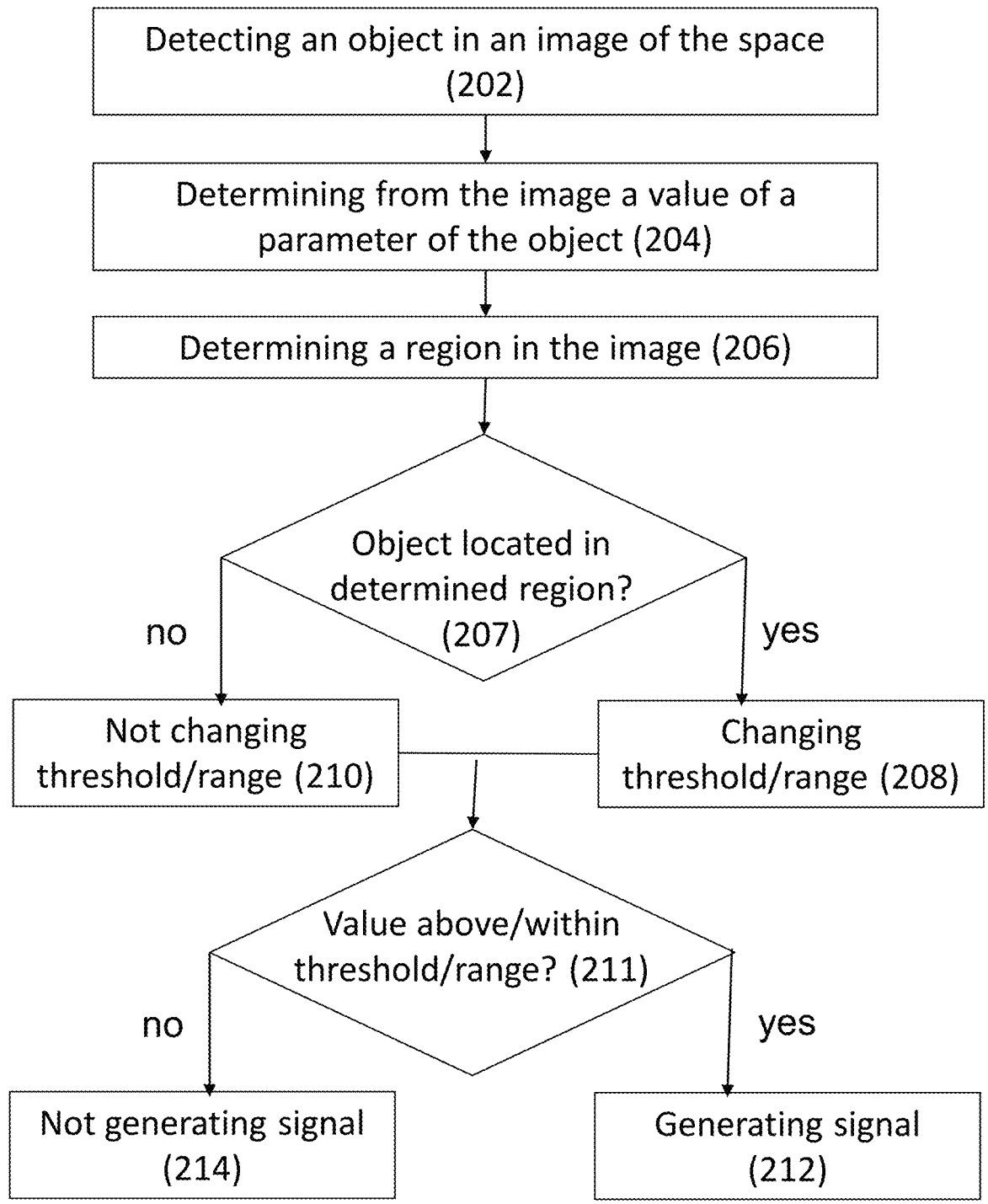
FIG. 2 is a schematic illustration of a method for detecting a person in an image, according to an embodiment of the invention.

In one embodiment, which is schematically illustrated in FIG. 2, a method carried out by a processor, such as processor 102, includes detecting an object in an image of a space (202) and determining a value of a parameter of the object from the image (204). If the determined value exceeds a pre-set or dynamically set threshold, or falls within a pre-set or dynamically set range, the object is determined to be a person (e.g., determined to have a probability above a predetermined threshold, of being a human). In one embodiment, detecting the object includes detecting a shape of the object in the image and the object is determined to be a person based on the detected shape and on the value of the parameter.

As discussed above, parameters of an object may include one or a combination of features characteristic of the object, for example, size of the object, size of motion created by the object, direction of motion of the object and profile of the motion field created by the motion. Other characteristic features of an object in an image may be used.

The method further includes determining at least one region (e.g., pre-defined area or dynamically defined area) in the image (206). If the object is located in the determined region (207) then the threshold and/or the range is changed (208). If the object is not located in the region (207) then the threshold and/or range is not changed (210).

The object is then determined to be a person based on the value of the parameter. A signal (e.g., a signal to control a device) is generated based on the determination that the object is a person. For example, in one embodiment if the value is above the threshold or within the range (211) then a signal is generated (212) and a device may be controlled based on the generated signal. However, if the value is below the threshold or outside the range (211) no signal or a different signal may be generated (214).

The signal generated in step 212 may be used, for example, to determine a number of occupants in a space and/or to assign space related resources and to update a display of a device based on the number of occupants and/or on the assignment of resources.

Figure 3:
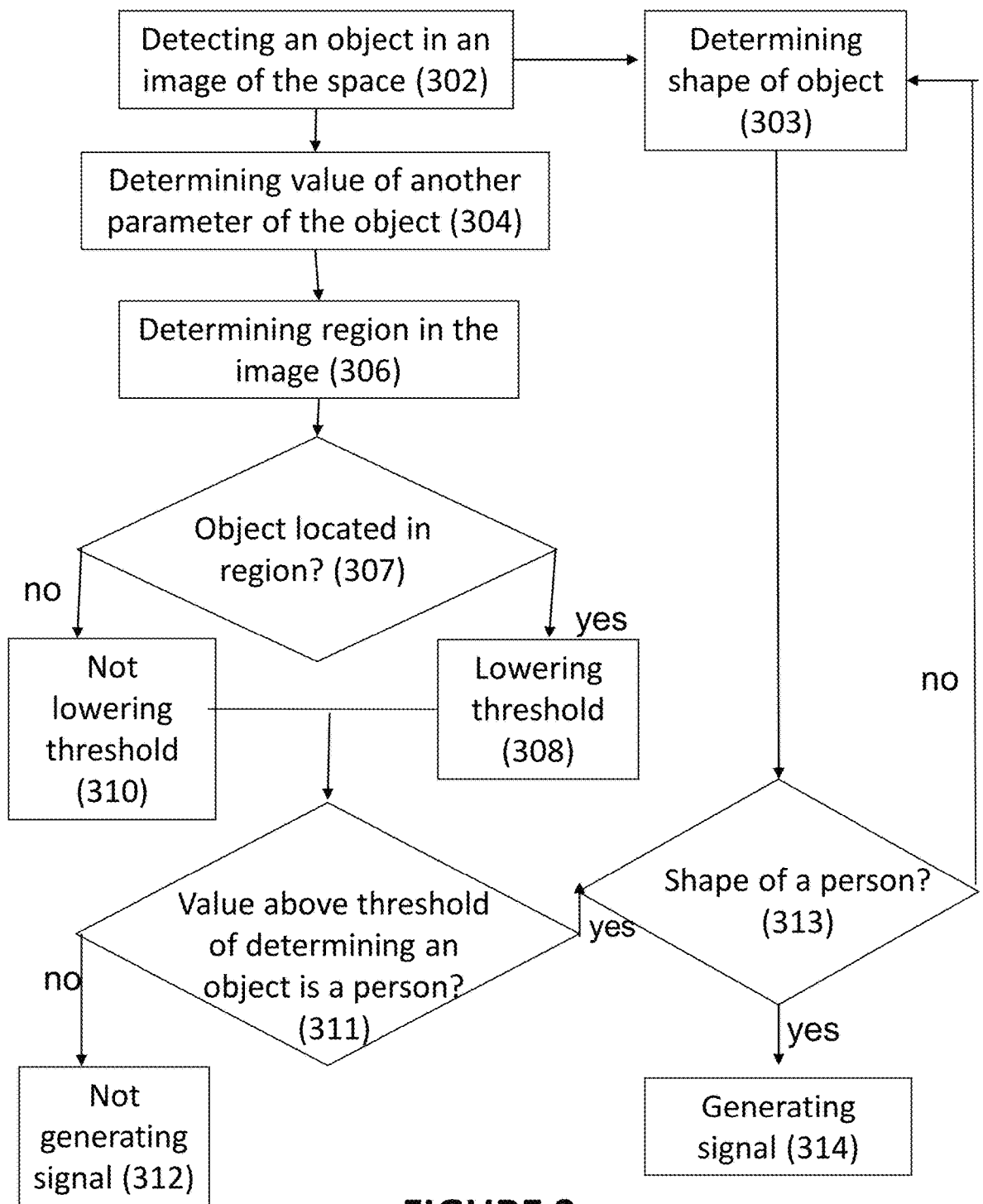
FIG. 3 is a schematic illustration of a method for determining that an object in an image is a person based on the shape of the object, according to an embodiment of the invention.

In an embodiment, which is schematically illustrated in FIG. 3, a method carried out by a processor, such as processor 102, includes detecting an object in an image of a space (302) and determining a shape of the object from the image (303).

In parallel, a value of a parameter of the object is determined from the image (304). As discussed above, parameters of an object may include one or a combination of, for example, motion size and object size. Other parameters of an object may be used.

The method further includes determining at least one region in the image (306). If the object is located in the determined region (307) then a threshold of determining an object is a person, is lowered (308). If the object is not located in the determined region (307) then the threshold is not lowered (310).

If the value of the parameter (determined in step 304) is above the threshold of determining an object is a person (311) and if the shape of the object (detected in step 303) is a shape of a person (313) then a signal is generated (314) and a device may be controlled based on the generated signal. However, if the value is below the threshold of determining an object is a person (311) no signal or a different signal may be generated (312).

A shape of an object may be detected by applying computer vision algorithms on the image, such as described above.

In one embodiment an object (e.g., object 105) is tracked in images of the space, e.g., to help determine that the object is a person, to help count people, to determine locations of people in the space, etc.

The object (e.g., object 105) may be tracked (e.g., by processor 102) through a sequence of images of the space using known tracking techniques such as optical flow or other suitable methods. In one embodiment an object is tracked based on its shape. For example, an object is detected in a first image from a sequence of images and a probability of the object of being a person is determined. If the probability is above a predetermined threshold the object is tracked to a second image in the sequence of images. For example, a selected feature from within the object from the first image is tracked. Shape recognition algorithms are applied at a suspected location of the object in a later, second, image from the sequence of images to detect a shape of the object in the second image and a new selected feature from within the detected shape of the object is then tracked, thereby providing verification and updating of the location of the object in the images.

In one embodiment the object (e.g., object 105) is tracked in images of the space and if the object is determined to be a person tracking of the object is continued and if the object is not determined to be a person, the tracking of the object is discontinued.

Figure 4:
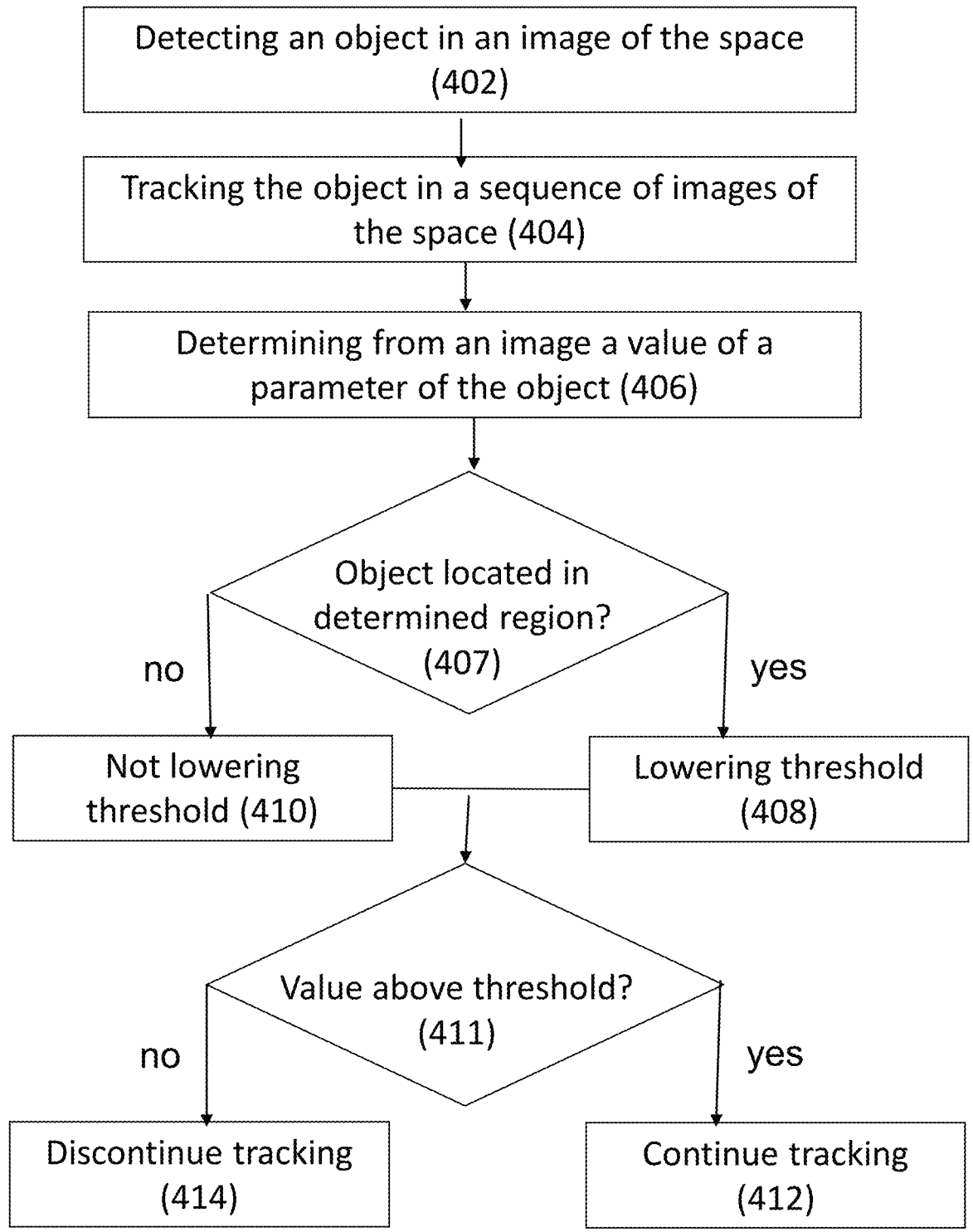
FIG. 4 is a schematic illustration of a method for detecting and tracking a person in an image, according to an embodiment of the invention.

In one embodiment, which is schematically illustrated in FIG. 4, a method carried out by a processor, such as processor 102, includes detecting an object in an image of a space (402) and tracking the object in a sequence of images of the space (404).

A value of a parameter of the object is determined from at least one image from the sequence of images (406). As discussed above, parameters of an object may include one or a combination of, for example, size of the object, size of motion created by the object, direction of motion of the object, profile of the motion field created by the motion, etc. Other parameters of an object may be used.

If the object is located in a determined region in the image (407) then a threshold of determining an object is a person, is lowered (408). If the object is not located in the determined region (407) then the threshold is not lowered (410).

If the value of the parameter (determined in step 406) is below the threshold (411) tracking of the object is discontinued (412). However, if the value of the parameter is above the threshold (411) then tracking of the object is continued (414).

In some embodiments a device may be controlled based on the tracking of the object. For example, locations of the tracked person may be used by a device for counting occupants in the space, for monitoring occupants, for automatically assigning space related resources in spaces (such as automatically assigning desks in office space), and more.

In one embodiment, the probability of an object being a person is based on a parameter of the object (such as size of the object, size of motion created by the object, direction of motion of the object, or, for example, a combination of motion size and object size) if the value of the parameter is within a pre-set or dynamically set range. For example, a range of a value of the size of the object may be in between a size of a sitting person and a size of a standing person in a top view image. In one embodiment if the value is within the predetermined range then the probability that the object is a person is raised if the object is located in a predetermined area (e.g., an area of a furniture such as a chair or desk) and lowered if the object is not located in the predetermined area.

Figure 5:
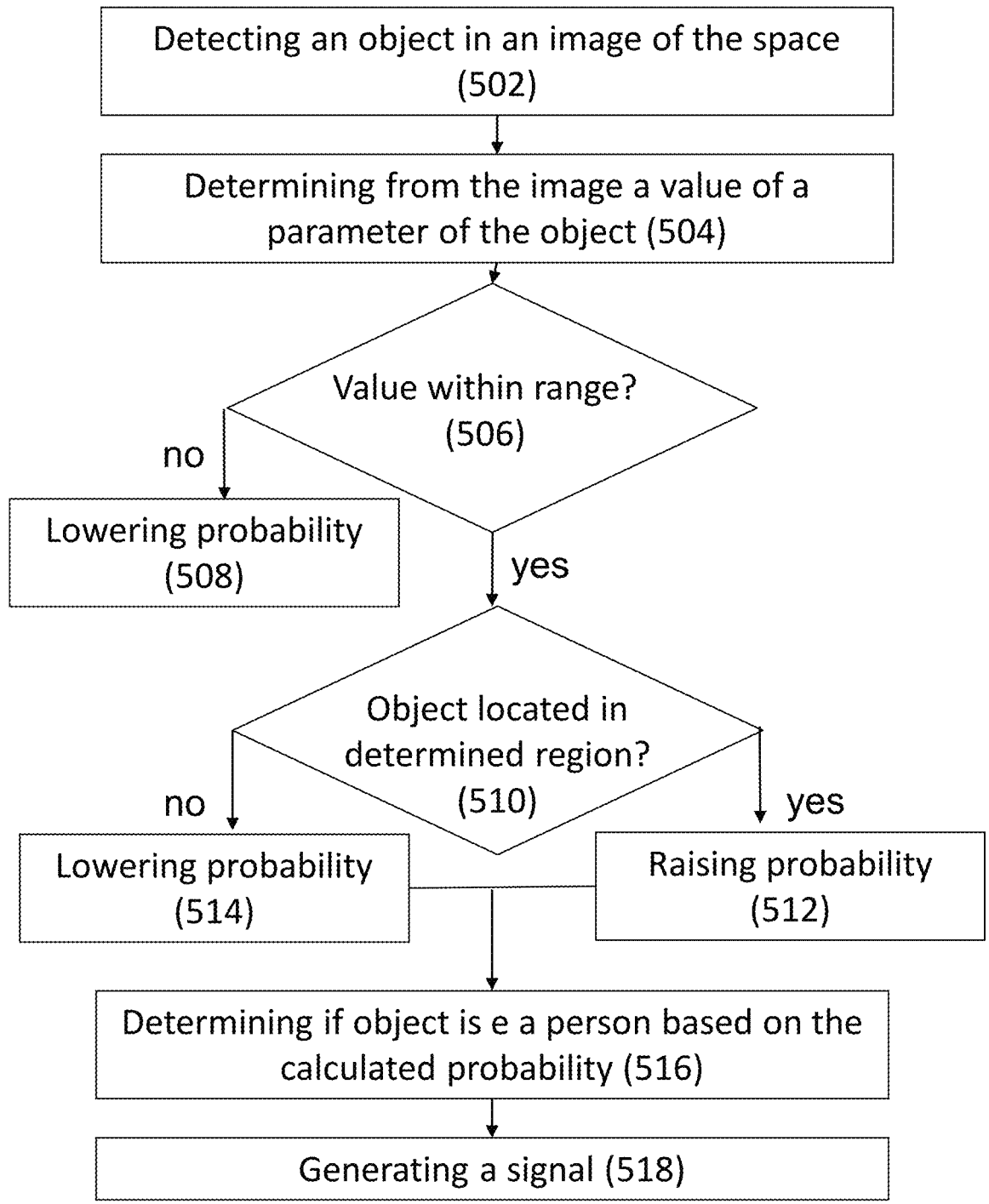
FIG. 5 is a schematic illustration of a method for determining that an object in an image is a person based the value of a parameter of the object being within a predetermined range, according to embodiments of the invention.

In an exemplary embodiment, which is schematically illustrated in FIG. 5, a method for detecting a person in an image includes calculating the probability of the object being a person. In one embodiment, the method includes detecting an object (having a probability of being a person) in an image of a space (502) and determining from the image a value of a parameter of the object (504). If the value is not within a predetermined range (506) then the probability of the object being a person is lowered (508). If the value is within the predetermined range, then the probability of the object being a person is raised (512) if the object is located in a determined region (510) and lowered (514) if the object is not located in the determined region (510). The object may be determined to be a person based on the thus calculated probability (516). A signal (e.g., to control a remote device) may be generated based on the determination that the object is a person (518).

As described above, the determined region (e.g., an area of a workstation) may be an area of a real-world location (desk or other work area) which is transformed to a location in the image (e.g., using information such as distance of the camera from the floor, size of image etc.). Alternatively, a determined region may be detected from one or more images (e.g., by detecting a workstation in the image or based on long-term statistics, as described above). In one embodiment, a location of the object in the image may be transformed from image coordinates to real world coordinates by using, for example, projective geometry. If the real world coordinates correspond to a predetermined area (e.g., work area) then the location of the object in the image may be determined to be the determined region.

In some embodiments the method includes detecting a shape of the object in the image and assigning to the object a probability of being a person based on the detected shape. Namely, raising the probability if the detected shape is a shape of a person.

Figure 6:
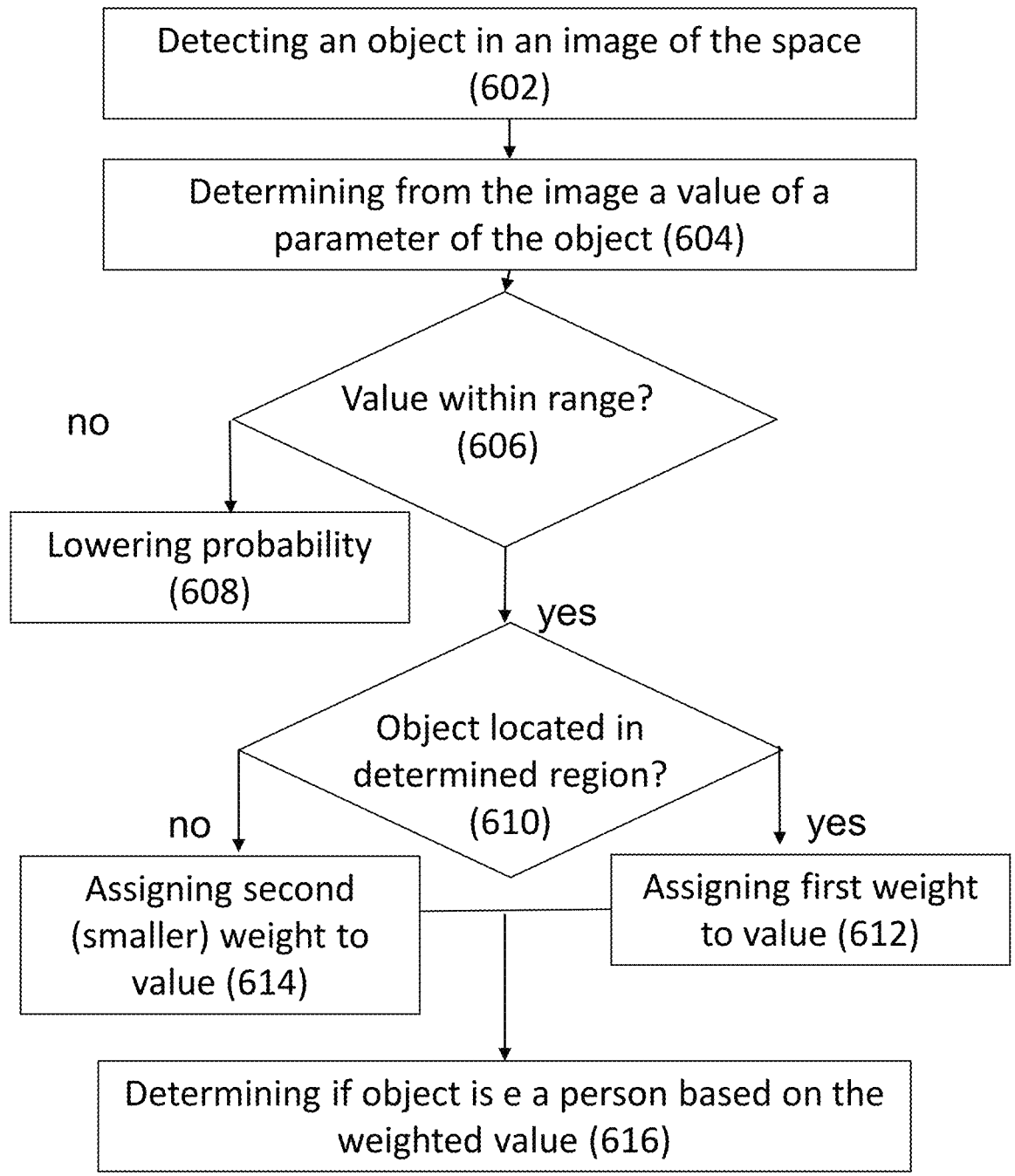
FIG. 6 is a schematic illustration of a method for determining that an object in an image is a person based on weighted values, according to embodiments of the invention.

In one embodiment, which is schematically illustrated in FIG. 6, the method includes detecting an object in an image of a space (602) and determining from the image a value of a parameter of the object (604). If the value is not within a predetermined range (606) then lowering the probability of the object being a person (608). If the value of the parameter of the object is within a predetermined range (606) and if the object is located in a determined region (610) then assigning a first weight to the value (612). If the object is not located in the determined region (610) then assigning a second, smaller, weight to the value (614). The object is determined to be a person based on the weighted value (616).

A signal may be generated based on the determination that the object is a person. For example, in some embodiments tracking of an object is continued only if it is determined that the object is a person. Thus, the signal generated based on the determination that the object is a person may be used to continue or discontinue tracking an object.

In other embodiments the signal, which may be used to control a remote device, may cause a change in displayed content. In one embodiment, the signal may be used to assign space related resources, e.g., by detecting occupied desks (by detecting people at the locations of desks, according to embodiments of the invention) and assigning unoccupied desks to new workers.

Figure 7:
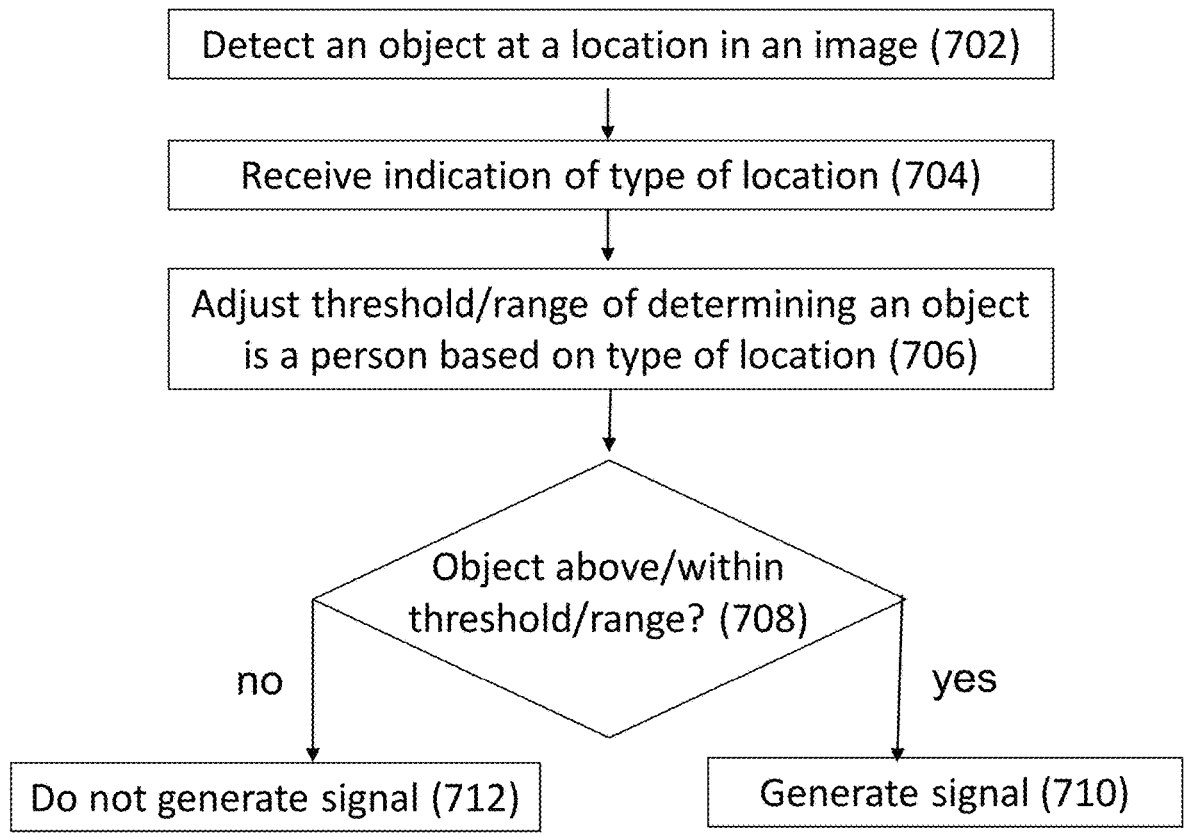
FIG. 7 is a schematic illustration of a method for calibrating parameters of occupancy detection based on a type of region in an image, according to an embodiment of the invention.

In one embodiment, which is schematically illustrated in FIG. 7, a processor, such as processor 102, detects an object at a location in an image of a space (702). The processor further receives an indication of the type of location in the image (704).

Such an indication may be based on analysis of the image of the space. For example, an indication may be a signal generated by a processor after detecting an area (e.g., a predefined are) from the image, such as described above. In another embodiment an indication of a type of location may be based on input from a user, such as input from a building management personnel.

Types of locations may include, for example, locations with a specific purposes (e.g., meeting room, server room, etc.), locations with specific content (e.g., specific pieces of furniture, such as, desks, chairs, etc.), or locations with specific statistics (e.g., high or low occupancy locations, etc.) or a combination of types.

The processor then adjusts thresholds (or ranges) for determining that an object is a person, based on the type of location (706).

The processor then determines if the object is above the adjusted threshold (or within the adjusted range) (708) to determine if the object is a person. For example, a value of a parameter of the object may be determined from the image, as described above, and if the determined value exceeds the adjusted threshold, or falls within the adjusted range, the object is determined to be a person (e.g., determined to have a probability above a predetermined threshold, of being a human).

A signal may be generated based on the determination that the object is a person. For example, if the object is above the adjusted threshold (or within the adjusted range) (708) then a signal is generated (710). However, if the object is below the adjusted threshold (or outside of the adjusted range) (708) no signal or a different signal is generated (712).

In some embodiments a value of a parameter of the object is determined from the image and if the value exceeds a threshold the object is determined to be a person. The threshold can be changed if the object is located in a predetermined area in the image and based on the type of location.

As described above, the signal generated based on the determination that the object is a person may be used to continue or discontinue tracking an object, to control a remote device, to cause a change in displayed content, etc.

Systems and methods according to embodiments of the invention enable to tie assumptions regarding human behavior to actual solutions for facilitated detection of people from images.

What is claimed is:

1. A method for detecting a person in an image, the method comprising:
   detecting an object in an image of a space;
   determining a weighted value of a parameter of the object from the image, by assigning to a value of a parameter of the object a first weight if the object is located in a predetermined area and assigning to the value a second weight, which is smaller than the first weight, if the object is not located in the predetermined area, wherein if the weighted value exceeds a threshold, which is determined based on location of the object, the object is determined to be a person;
   determining that the object is a person based on the weighted value of the parameter and on the threshold; and
   generating a signal to assign space related resources based on the determination that the object is a person.

2. The method of claim 1 comprising lowering the threshold if the object is located in a predetermined area in the image.

3. The method of claim 1 comprising:
   detecting a shape of the object in the image of the space, and determining that the object is a person based on the detected shape and on the value of the parameter and threshold.

4. The method of claim 1 wherein the predetermined area correlates to a predefined location in the space, comprising at least one of: home, room and building.

5. The method of claim 4 comprising:
identifying the predefined location from an image of the space; and
determining the predetermined area based on the identification.

6. The method of claim 4 comprising:
receiving a signal indicating the predefined location; and
determining the predetermined area based on the signal.

7. The method of claim 4 wherein the predefined location in the space comprises furniture.

8. The method of claim 7 wherein the furniture comprises one or more of: a chair, a desk and a bed.

9. The method of claim 1 comprising aggregating data from images of the space to detect the predetermined area in the image.

10. The method of claim 1 wherein the parameters of the object comprise one or a combination of: motion size and object size.

11. The method of claim 1 wherein the signal generated based on the determination that the object is a person is to cause a change in displayed content.

12. The method of claim 1 comprising tracking the object in images of the space and, if the object is determined to be a person, continuing to track the object and, if the object is not determined to be a person, discontinuing tracking of the object.

13. The method of claim 4 comprising:
receiving an indication of type of location in the space; and
changing the threshold based on the type of location.

14. The method of claim 13 wherein a type of location comprises one or more of a location with a specific purpose, a location with specific content or a location with specific statistics.

15. The method of claim 13 wherein the indication of type of location comprises a signal generated by a processor after detecting the predefined area from the image.

16. The method of claim 13 wherein the indication of type of location is based on user input.

17. The method of claim 1 wherein the device comprises a space related resource management system to assign workstations to occupants in the space.

18. The method of claim 1 wherein the image of the space is a top view image.

19. A method for detecting a person in an image, the method comprising
detecting an object in an image of a space;
determining a value of a parameter of the object from the image, wherein if the value exceeds a threshold the object is determined to be a person;
if the object is located in a predetermined area in the image then changing the threshold;
determining that the object is a person based on the value of the parameter and the changed threshold; and
generating a signal to cause a change in displayed content, based on the determination that the object is a person.

20. A system comprising a processor, memory and display, wherein the processor is to
detect an object in an image of a space;
determine a weighted value of a parameter of the object from the image, by assigning to a value of a parameter of the object a first weight if the object is located in a predetermined area and assigning to the value a second weight, which is smaller than the first weight, if the object is not located in the predetermined area, wherein if the weighted value exceeds a threshold, which is determined based on location of the object, the object is determined to be a person;
determine that the object is a person based on the weighted value of the parameter and on the threshold;
generate a signal to assign space related resources based on the determination that the object is a person; and
cause a change in content displayed on the display.

* * * * *